(12) United States Patent
Gal et al.

(10) Patent No.: US 8,182,577 B2
(45) Date of Patent: May 22, 2012

(54) MULTI-STAGE CO2 REMOVAL SYSTEM AND METHOD FOR PROCESSING A FLUE GAS STREAM

(75) Inventors: Eli Gal, Cupertino, CA (US); Otto M. Bade, Stabekk (NO); Dennis J. Laslo, Knoxville, TN (US); Frederic Z. Kozak, Knoxville, TN (US); David J. Muraskin, Knoxville, TN (US); Jurgen Dopatka, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 67 days.

(21) Appl. No.: 12/255,104

(22) Filed: Oct. 21, 2008

(65) Prior Publication Data
US 2009/0101012 A1    Apr. 23, 2009

Related U.S. Application Data

(60) Provisional application No. 60/981,742, filed on Oct. 22, 2007.

(51) Int. Cl.
*B01D 53/14* (2006.01)

(52) U.S. Cl. .................. 95/16; 95/195; 95/199; 95/236; 96/236; 96/251

(58) Field of Classification Search .................. 95/225, 95/228
See application file for complete search history.

(56) References Cited

U.S. PATENT DOCUMENTS

| | | | |
|---|---|---|---|
| 1,897,725 A | 2/1933 | Gau et al. | |
| 2,106,734 A | 2/1935 | Gollmar | |
| 2,043,109 A | 6/1936 | McKee et al. | |
| 2,487,576 A | 11/1949 | Meyers | |
| 2,608,461 A | 8/1952 | Frazier | |
| 2,878,099 A | 3/1959 | Breuing et al. | |
| 2,889,197 A | 6/1959 | Baumann | |
| 3,255,233 A | 6/1966 | Kunze et al. | |
| 3,923,955 A | 12/1975 | Fattinger | |
| 4,035,166 A * | 7/1977 | Van Hecke | 95/163 |
| 4,515,760 A | 5/1985 | Lang et al. | |
| 4,847,057 A | 7/1989 | Brugerolle et al. | |
| 4,977,745 A | 12/1990 | Heichberger | |
| 4,999,031 A | 3/1991 | Gerhardt et al. | |
| 5,067,972 A | 11/1991 | Hemmings et al. | |
| 5,137,550 A | 8/1992 | Hegarty et al. | |
| 5,186,916 A | 2/1993 | Nevels | |
| 5,318,758 A | 6/1994 | Fujii | |

(Continued)

FOREIGN PATENT DOCUMENTS

AU    648129    7/1992

(Continued)

OTHER PUBLICATIONS

PCT International Search Report and The Written Opinion of the International Searching Authority dated May 2, 2009—(PCT/US2008/080703).

(Continued)

*Primary Examiner* — Duane Smith
*Assistant Examiner* — Pankti Patel
(74) *Attorney, Agent, or Firm* — Robert D. Crawford

(57) ABSTRACT

An ammonia based CO2 capture system and method is provided in which multiple absorption stages are provided. Each absorption stage delivers an ionic solution at a predetermined temperature and contacts it with a flue gas stream.

20 Claims, 8 Drawing Sheets

U.S. PATENT DOCUMENTS

| | | | |
|---|---|---|---|
| 5,378,442 A | 1/1995 | Fujii et al. | |
| 5,427,759 A | 6/1995 | Heitmann | |
| 5,453,115 A | 9/1995 | Vuletic | |
| 5,462,583 A | 10/1995 | Wood et al. | |
| 5,599,508 A | 2/1997 | Martinelli et al. | |
| 5,648,053 A | 7/1997 | Mimura et al. | |
| 5,700,311 A | 12/1997 | Spencer | |
| 5,756,058 A | 5/1998 | Watanabe et al. | |
| 5,832,712 A | 11/1998 | Rønning et al. | |
| 5,853,680 A | 12/1998 | Iijima et al. | |
| 5,979,180 A | 11/1999 | Lebas et al. | |
| 6,027,552 A | 2/2000 | Ruck et al. | |
| 6,210,467 B1 | 4/2001 | Howard | |
| 6,348,088 B2 | 2/2002 | Chung | |
| 6,372,023 B1 | 4/2002 | Kiyono et al. | |
| 6,458,188 B1 | 10/2002 | Mace | |
| 6,485,547 B1 | 11/2002 | Iijima | |
| 6,497,852 B2 | 12/2002 | Chakravarti et al. | |
| 6,506,350 B2 | 1/2003 | Cooper et al. | |
| 6,759,022 B2 | 7/2004 | Hammer et al. | |
| 6,764,530 B2 | 7/2004 | Iijima | |
| 7,022,296 B1 | 4/2006 | Khang et al. | |
| 7,083,662 B2 | 8/2006 | Xu et al. | |
| 7,128,777 B2 | 10/2006 | Spencer | |
| 7,160,456 B2 | 1/2007 | Järventie | |
| 7,255,842 B1* | 8/2007 | Yeh et al. | 423/234 |
| 7,641,717 B2* | 1/2010 | Gal | 95/187 |
| 2003/0045756 A1 | 3/2003 | Mimura et al. | |
| 2003/0140786 A1 | 7/2003 | Iijima | |
| 2004/0123736 A1 | 7/2004 | Torres, Jr. et al. | |
| 2004/0126294 A1 | 7/2004 | Cooper et al. | |
| 2005/0169825 A1 | 8/2005 | Cadours et al. | |
| 2006/0178259 A1 | 8/2006 | Schubert et al. | |
| 2006/0204425 A1 | 9/2006 | Kamijo et al. | |
| 2006/0286017 A1* | 12/2006 | Hakka | 423/220 |
| 2007/0006565 A1 | 1/2007 | Fleischer et al. | |
| 2008/0072762 A1 | 3/2008 | Gal | |
| 2008/0178733 A1 | 7/2008 | Gal | |
| 2008/0307968 A1 | 12/2008 | Kang et al. | |
| 2009/0101012 A1 | 4/2009 | Gal et al. | |
| 2009/0155889 A1 | 6/2009 | Handagama et al. | |
| 2009/0282977 A1 | 11/2009 | Koss | |
| 2010/0296998 A1* | 11/2010 | Mori | 423/502 |

FOREIGN PATENT DOCUMENTS

| | | |
|---|---|---|
| AU | 678622 | 6/1995 |
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| DE | 10 2005 033837 | 1/2007 |
| EP | 0 193 677 | 9/1986 |
| EP | 0243778 | 11/1987 |
| EP | 0502596 | 9/1992 |
| EP | 0553643 | 8/1993 |
| EP | 0588178 | 3/1994 |
| EP | 1759756 | 3/2007 |
| GB | 271852 | 5/1926 |
| GB | 871207 | 6/1961 |
| GB | 899611 | 6/1962 |
| GB | 2331526 | 5/1999 |
| JP | 29424/64 | 12/1964 |
| JP | 10 202054 | 8/1998 |
| JP | 11 137960 | 5/1999 |
| KR | 1020050070285 | 7/2005 |
| KR | 10-0650556 | 11/2006 |
| KR | 100703999 B1 | 3/2007 |
| SU | 512785 | 5/1976 |
| SU | 1567251 | 5/1990 |
| WO | 98/47604 | 10/1998 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | WO 2006/022885 A1 | 3/2006 |
| WO | 2008/094777 | 8/2008 |
| WO | 2008/101293 | 8/2008 |
| WO | 2008/144918 | 12/2008 |
| WO | 2010/053683 | 5/2010 |

OTHER PUBLICATIONS

Figueroa et al.: "Advances in CO2 capture technology—The U.S. Department of Energy's Carbon Sequestration program", vol. 2, No. 1, Sep. 17, 2007, pp. 9-20.

Yeh et al.: "Semi-batch absorption and regeneration studies for CO2 capture by aqueous ammonia", *Fuel Processing Technology*, vol. 86, No. 14-15, Oct. 1, 2005, pp. 1533-1546.

A.C. Yeh, H. Bai: "Comparison of ammonia and monoethanolamine solvents to reduce CO2 greenhouse gas emissions" *The Science of the Total Environment*, vol. 338, 1999, pp. 121-133, XP002529608.

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. And Management, May 31, 2004 (approx.), pp. 89-104, vol. 4, No. 1/2.

Andrea Corti et al., "Reduction of Carbon Dioxide emissions from a SCGT/CC by Ammonia Solution Absorption Preliinary Results" International Journal of Thermodynamics, International Centre for Applied Thermodynamics, Istanbul, TR, vol. 7, No. 4, Dec. 1, 2004, pp. 173-181.

Japanese Office Action dated Oct. 14, 2011.
Korean Office Action dated Nov. 7, 2011.

* cited by examiner

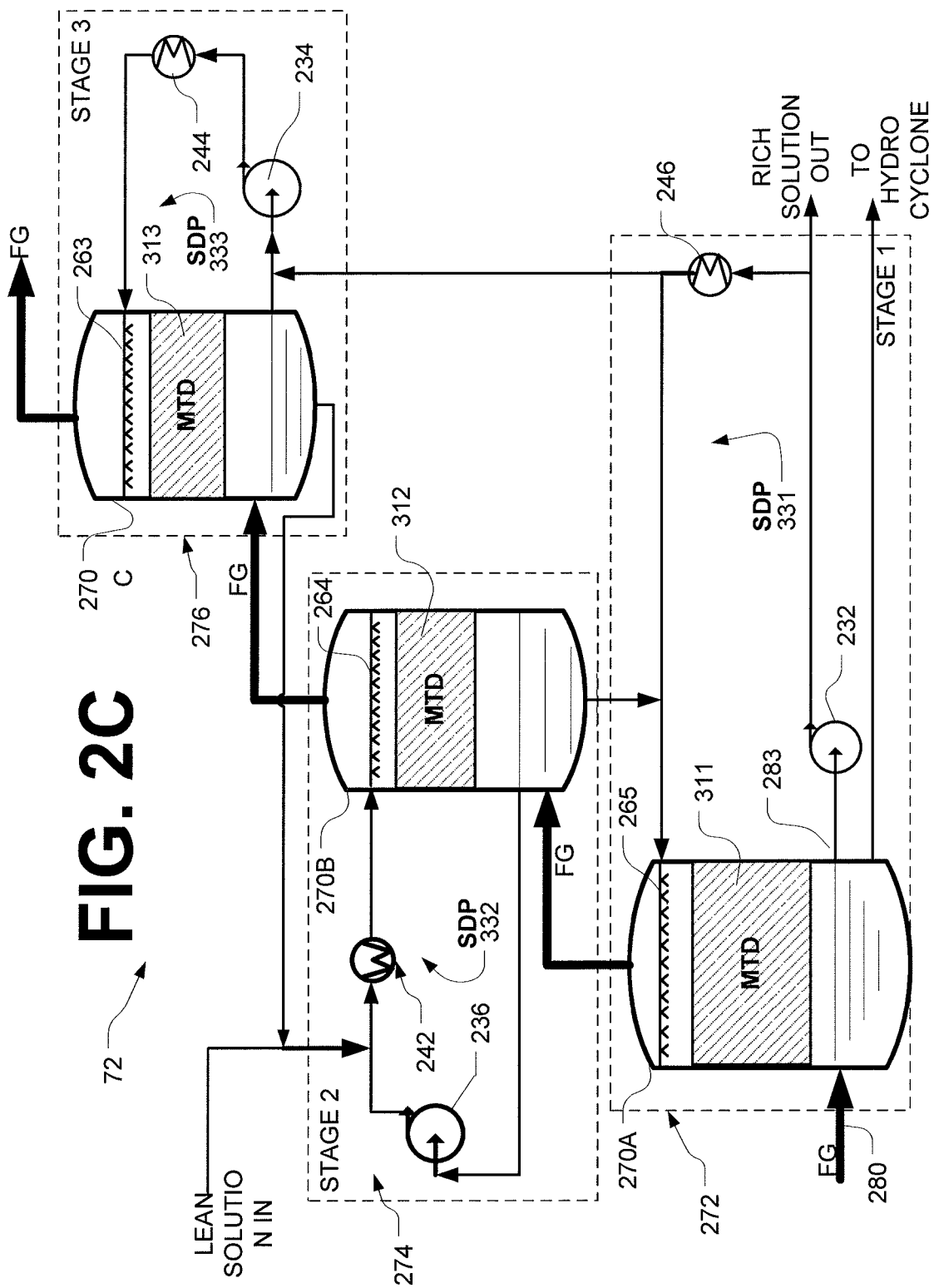

MULTI-STAGE CO2 REMOVAL SYSTEM AND METHOD FOR PROCESSING A FLUE GAS STREAM

CROSS REFERENCE TO RELATED APPLICATION(S)

This application claims priority to copending U.S. provisional application entitled, "Staged CO2 Absorption in the Chilled Ammonia Process", having ser. no. U.S. 60/981,742, filed on Oct. 22, 2007, the disclosure of which is entirely incorporated herein by reference.

FIELD OF THE INVENTION

The proposed invention relates to a system and method for removing carbon dioxide (CO2) from a process gas stream containing carbon dioxide and sulphur dioxide. More particularly, the proposed invention is directed to a chilled ammonia based flue gas processing system for removing CO2 from a flue gas stream. The proposed invention includes a multi-stage CO2 absorber system for enhanced CO2 capture efficiency.

SUMMARY OF THE INVENTION

Embodiments of the present invention provide a system and method for capturing carbon dioxide (CO2) from a process gas stream. Briefly described, in architecture, one embodiment of the system, among others, can be implemented so as to include an absorber vessel having multiple absorption stages, for receiving a flue gas stream (FG) and an ionic solution and placing the ionic solution in contact with the flue gas stream.

In one embodiment, an absorber vessel is provided that includes a first absorption stage; a second absorption stage; and a third absorption stage. In a further embodiment a first absorber vessel is provided that includes a first absorption stage; a second absorber vessel is provided that includes a second absorption stage and a third absorption vessel is provided that includes a third absorption stage.

Embodiments of the present invention can also be viewed as providing a method for removing CO2 from a flue gas stream. In this regard, one embodiment of such a method, among others, can be broadly summarized by the following steps: contacting a first ionic solution flow with a flue gas stream to remove a first portion of CO2 from the flue gas stream; contacting a second ionic solution flow with the flue gas stream to remove a second portion of CO2 from the flue gas stream; contacting a third ionic solution flow with a flue gas stream to remove a third portion of CO2 from the flue gas stream; and cooling the third ionic solution flow so as to minimize ammonia slip from the ionic solution.

Other systems, methods, features, and advantages of the present invention will be or become apparent to those with ordinary skill in the art upon examination of the following drawings and detailed description. It is intended that all such additional systems, methods, features, and advantages be included within this description, be within the scope of the present invention, and be protected by the accompanying claims.

BACKGROUND

In the combustion of a fuel, such as coal, oil, peat, waste, etc., in a combustion plant, such as a power plant, a hot process gas is generated, such a hot process gas, often referred to as a flue gas, containing, among other components, carbon dioxide, $CO_2$. The negative environmental effects of releasing carbon dioxide to the atmosphere have been widely recognised, and have resulted in the development of processes adapted for removing carbon dioxide from the hot process gas generated in the combustion of the above mentioned fuels. One such system and process has previously been disclosed and is directed to a single-stage Chilled Ammonia based system and method for removal of carbon dioxide (CO2) from a post-combustion flue gas stream. Such a system and process has been proposed and taught in published US Patent Application 20080072762 (inventor: Eli Gal) entitled Ultra Cleaning of Combustion Gas Including the Removal of CO2, the disclosure of which is incorporated herein by reference.

FIG. 1A is a diagram generally depicting a flue gas processing system 15 for use in removing various pollutants from a flue gas stream FG emitted by the combustion chamber of a boiler system 26 used in a steam generator system of, for example, a power generation plant. This system includes a dust removal system 50 for removing dust/particulate matter (PM), a scrubber system 60 (wet or dry or a combination thereof) and a CO2 Removal system 70.

CO2 removal system 70 is configured to remove CO2 from the flue gas stream FG before emitting the cleaned flue gas stream to an exhaust stack 90. It is also configured to output CO2 removed form the flue gas stream FG. Details of CO2 Removal system 70 are generally depicted in FIG. 1B.

With reference to FIG. 1B, CO2 removal System 70 includes a capture system 72 for capturing CO2 from a flue gas stream FG and a regeneration system 74 for regenerating ionic solution used to remove CO2 from the flue gas stream FG. Details of capture system 72 are generally depicted in FIG. 1C.

With reference to FIG. 1C a capture system 72 of a CO2 capture system 70 (FIG. 1A) is generally depicted. In this system, the capture system 72 is a single-stage chilled ammonia based CO2 capture system. In a single-stage chilled ammonia based system/method for CO2 removal, an absorber vessel is provided in which an ionic solution is contacted with a flue gas stream containing CO2. The ionic solution may be composed of, for example, water and ammonium ions, bicarbonate ions, carbonate ions, and/or carbamate ions. An example of a known single stage CAP CO2 removal system is generally depicted in the diagram of FIG. 1C.

With reference to FIG. 1C, an absorber vessel 170 is configured to receive a flue gas stream (FG) originating from, for example, the combustion chamber of a fossil fuel fired boiler 26 (see FIG. 1A). It is also configured to receive a lean ionic solution supply from regeneration system 74 (see FIG. 1B). The lean ionic solution is introduced into the vessel 170 via a liquid distribution system 122 while the flue gas stream FG is also received by the absorber vessel 170 via flue gas inlet 76.

The ionic solution is put into contact with the flue gas stream via a gas-liquid contacting device (hereinafter, mass transfer device, MTD) 111 used for mass transfer and located in the absorber vessel 170 and within the path that the flue gas stream travels from its entrance via inlet 76 to the vessel exit 77. The gas-liquid contacting device 111 may be, for example, one or more commonly known structured or random packing materials, or a combination thereof.

Ionic solution sprayed from the spray head system 121 and/or 122 falls downward and onto/into the mass transfer device 111. The ionic solution cascades through the mass transfer device 111 and comes in contact with the flue gas stream FG that is rising upward (opposite the direction of the ionic solution) and through the mass transfer device 111.

Once contacted with the flue gas stream, the ionic solution acts to absorb CO2 from the flue gas stream, thus making the ionic solution "rich" with CO2 (rich solution). The rich ionic solution continues to flow downward through the mass transfer device and is then collected in the bottom 78 of the absorber vessel 170. The rich ionic solution is then regenerated via regenerator system 74 (see FIG. 1B) to release the CO2 absorbed by the ionic solution from the flue gas stream. The CO2 released from the ionic solution may then be output to storage or other predetermined uses/purposes. Once the CO2 is released from the ionic solution, the ionic solution is said to be "lean". The lean ionic solution is then again ready to absorb CO2 from a flue gas stream and may be directed back to the liquid distribution system 122 whereby it is again introduced into the absorber vessel 170.

After the ionic solution is sprayed into the absorber vessel 170 via spray head system 122, it cascades downward onto and through the mass transfer device 111 where it is contacted with the flue gas stream FG. Upon contact with the flue gas stream the ionic solution reacts with CO2 that may be contained in the flue gas stream. This reaction is exothermic and as such results in the generation of heat in the absorber vessel 170. This heat can cause some of the ammonia contained in the ionic solution to change into a gas. The gaseous ammonia then, instead of migrating downward along with the liquid ionic solution, migrates upward through the absorber vessel 170, along with and as a part of the flue gas stream and, ultimately, escaping via the exit 77 of the absorber vessel 170. The loss of this ammonia from the system (ammonia slip) decreases the molar concentration of ammonia in the ionic solution. As the molar concentration of ammonia decreases, so does the R value (NH3-to-CO2 mole ratio). This decrease in the R value corresponds to a decrease in the effectiveness of the ionic solution in capturing CO2 from the flue gas stream.

The effectiveness of the capture system 72 in removing CO2 from a flue gas stream rests largely on: 1) the temperature (T) of the ionic solution sprayed into the absorber vessel 170, and 2) the mole ratio (R) of ammonia contained in the ionic solution to the CO2 contained in the ionic solution.

The general effect of R and T on the systems CO2 capture efficiency is generally illustrated by the graph shown in FIG. 1D. The relative impact of ammonia slip is generally illustrated by the graph shown in FIG. 1E. In short, the lower the R value, the less effective an ammonia based CO2 capture system is in removing CO2 form a flue gas stream.

Temperature of the system may be controlled via heating and/or refrigeration systems. The mole ratio R of ammonia to CO2, however, can only be controlled by controlling the amount of ammonium in the ionic solution, since controlling the CO2 contained in the flue gas stream is not possible.

In order to minimize the amount of ammonia slip, the CO2 capture system 72 is preferably configured to operate at a low temperature (T), for example, a temperature from 0° C. up to 10° C. This may be achieved by, for example, controlling the temperature of the ionic solution introduced into the absorber vessel. It is also preferably configured to operate with the ionic solution having a low ammonia-to-CO2 mole ratio (R), for example, from 1.4 up to 1.8. This may be achieved by controlling the amount of lean solution introduced into the absorber vessel.

At low temperatures, for example, 0° C. up to 10° C., and low R values, for example, 1.4 up to 1.6 solid ammonium bicarbonate particles will precipitate from the ionic solution after it has been contacted with the flue gas stream. These solids contain very high concentrations of CO2 (approximately 55% by weight) that has been removed from the flue gas stream by virtue of the ionic solution being placed in contact therewith. Thus, the precipitation of the solids is desired since they contain high concentrations of CO2 and can be easily separated from the ionic solution and removed. However, in order to achieve the low temperatures required to cause solids to precipitate from the ionic solution, refrigeration equipment must be utilized. Additionally, in order to accommodate operation at a low R value, the volume/size of the absorber vessel 170 must be significantly increased.

The larger absorber vessel and refrigeration systems, as well as the operation thereof, are costly and greatly increase the costs associated with removing CO2 from a gas stream. A chilled ammonia based CO2 removal system having a single stage absorber system will thus be large, expensive and require high cooling capacity refrigeration systems to maintain a desired low operating temperature. Thus, a heretofore unaddressed need exists in the industry to address the aforementioned deficiencies and inadequacies.

Further, features of the present invention will be apparent from the description and the claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The invention will now be described in more detail with reference to the appended drawings in which:

FIG. 2C is a diagram generally depicting another embodiment of a capture system 72 that includes a multi-stage absorber system in which multiple separate absorber vessels are dedicated for each absorption stage.

DISCUSSION

The proposed invention is directed to a chilled ammonia based CO2 removal system for removing CO2 from a process gas stream that contains CO2. More particularly, the proposed invention is directed to a chilled ammonia based system for removal of CO2 from a flue gas stream wherein the system includes a multi-stage CO2 absorber system that is configured to contact an ionic solution with a flue gas stream containing carbon dioxide.

Figure 2A:
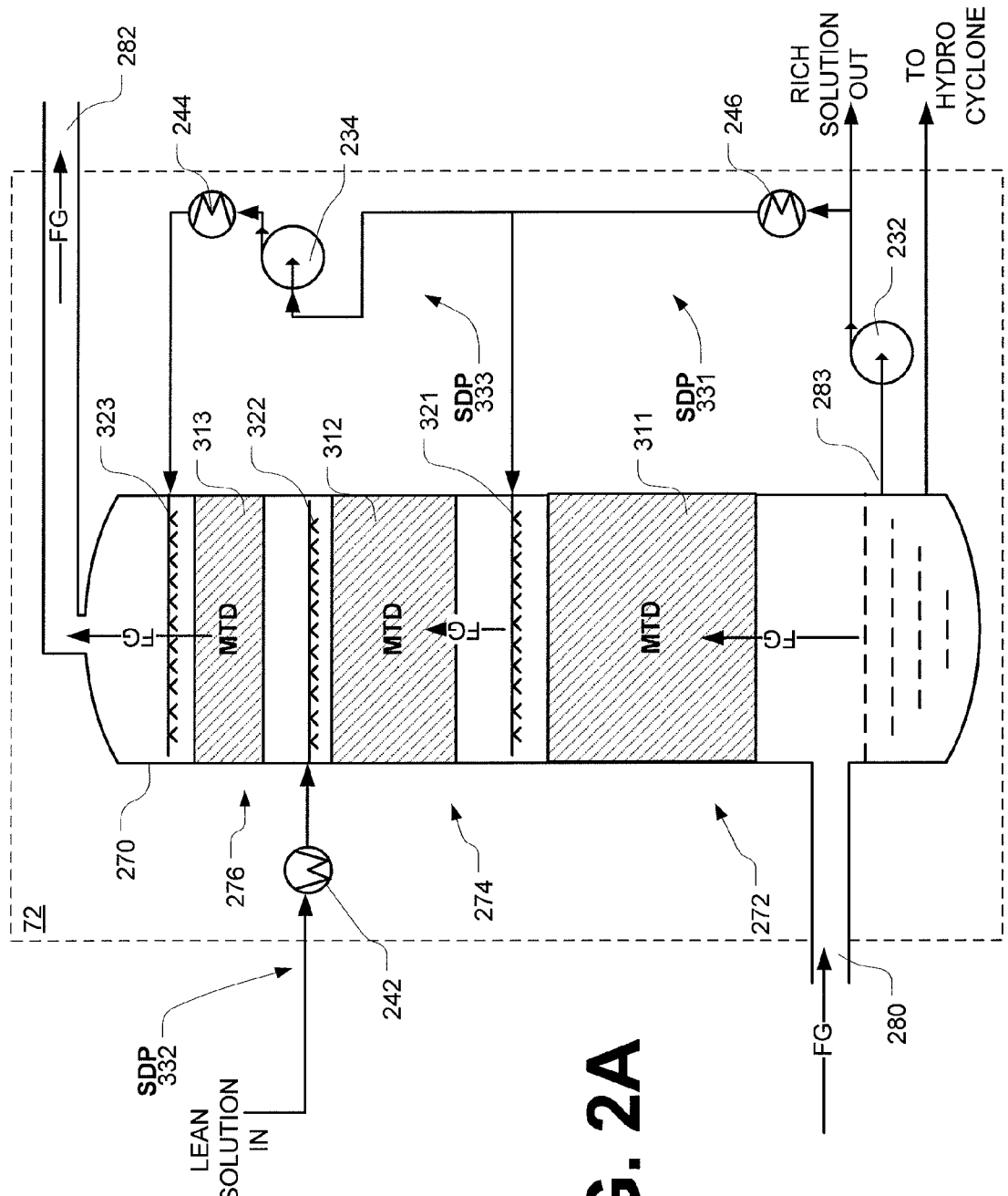
FIG. 2A is a diagram generally depicting an embodiment of a capture system 72 that includes a multi-stage absorber system.

One embodiment of the proposed invention is generally depicted in FIG. 2A. In this embodiment, a capture system 72 is provided that includes three (3) absorption stages. It is, however, possible to include more or fewer absorption stages in the capture system 72 without departing from the scope or spirit of the present invention.

Referring to FIG. 2A a single absorber vessel 270 is provided. The absorber vessel 270 is configured to receive a flue gas stream FG via an inlet 280 located near the bottom of the vessel 270 and to allow the flue gas stream FG to pass upward and through the absorber vessel 270 to exit via an outlet 282 located near the top of the vessel 270.

The flue gas stream FG entering the absorber vessel 270 (see FIG. 2A or FIG. 2B) will typically contain less than one percent moisture and low concentrations of SO2, SO3, HCl, and particulate matter (PM) which will typically be removed via air pollution control systems (not shown) upstream from the CO2 capture system. For example, the flue gas stream will typically contain less than 50 ppmv of SO2; less than 5 ppmv of SO3; less than 1 ppmv of HCL and/or less than 100 mg/nm$^3$ of PM.

The absorber vessel 270 is configured to absorb CO2 that may be contained in a flue gas stream, using an ionic solution. In a preferred embodiment, the ionic solution may be composed of, for example, water and ammonium ions, bicarbonate ions, carbonate ions, and/or carbamate ions.

Each absorption stage (272, 274 and 276) is configured to include one or more suitable gas-liquid mass transfer devices (MTD) (311, 312 and 313), a liquid distribution device (321, 322, 323) and a solution delivery path (SDP) (331, 332 and 333).

Each mass transfer device 311, 312 and 313 is configured to contact ionic solution with the flue gas stream FG as the flue gas flows upwards through the absorber vessel 270, counter current to the ionic solution containing, for example, dissolved and suspended mix of ammonium ions, carbonate ions, ammonium bicarbonate and/or carbamate ions in which the CO2 is absorbed. Mass transfer devices (MTD) 311, 312 and 313 may be, for example, structured or random packing materials.

Liquid distribution device(s) 321, 322, 323 are configured to introduce ionic solution into the absorber vessel 270. Each liquid distribution device may be configured as, for example, one or more spray head nozzles and/or conduit with perforations, holes and/or slots or a combination thereof.

Figure 1A:
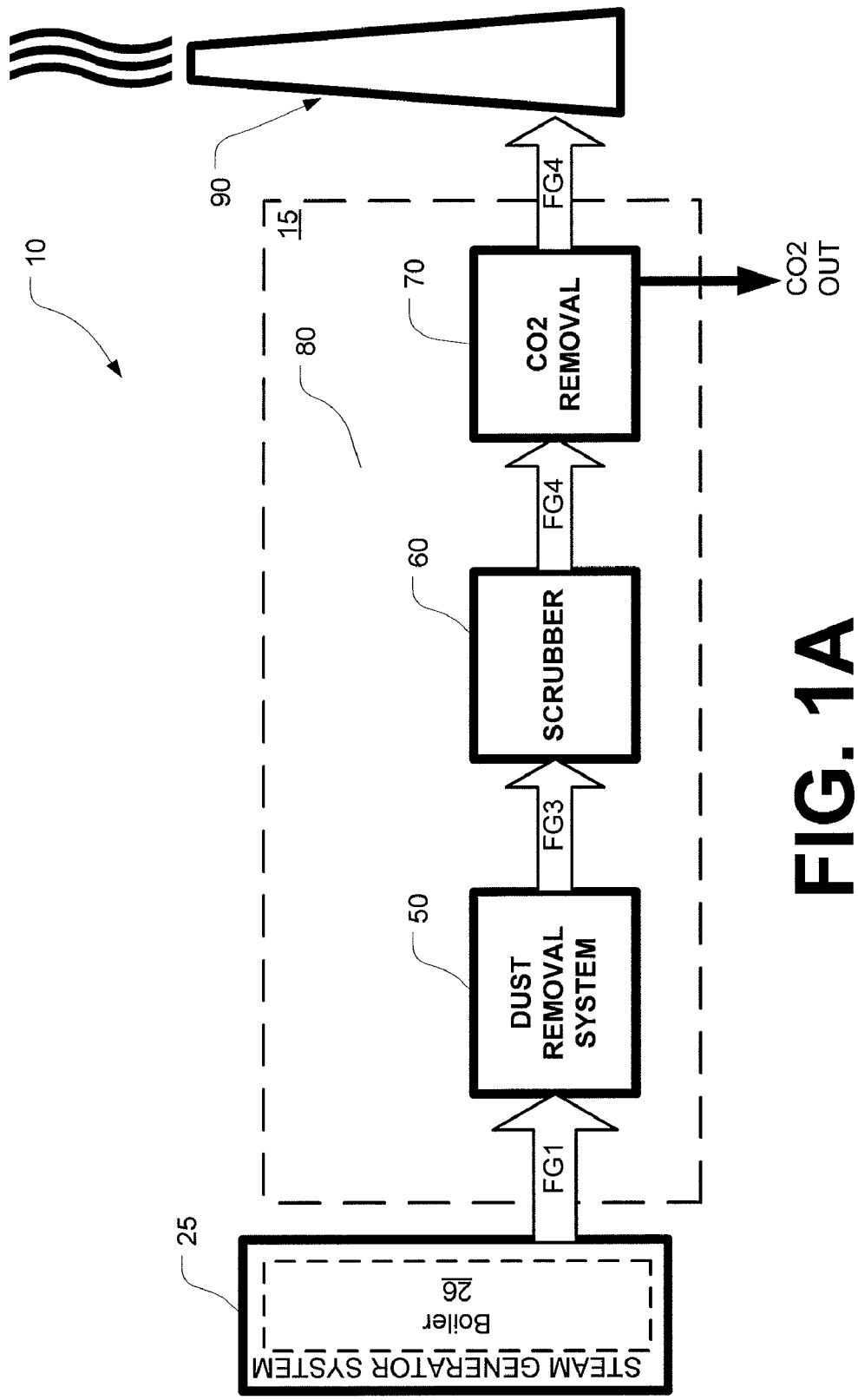
FIG. 1A is a diagram generally depicting a flue gas processing system 15 that includes a CO2 removal system 70.
Figure 1B:
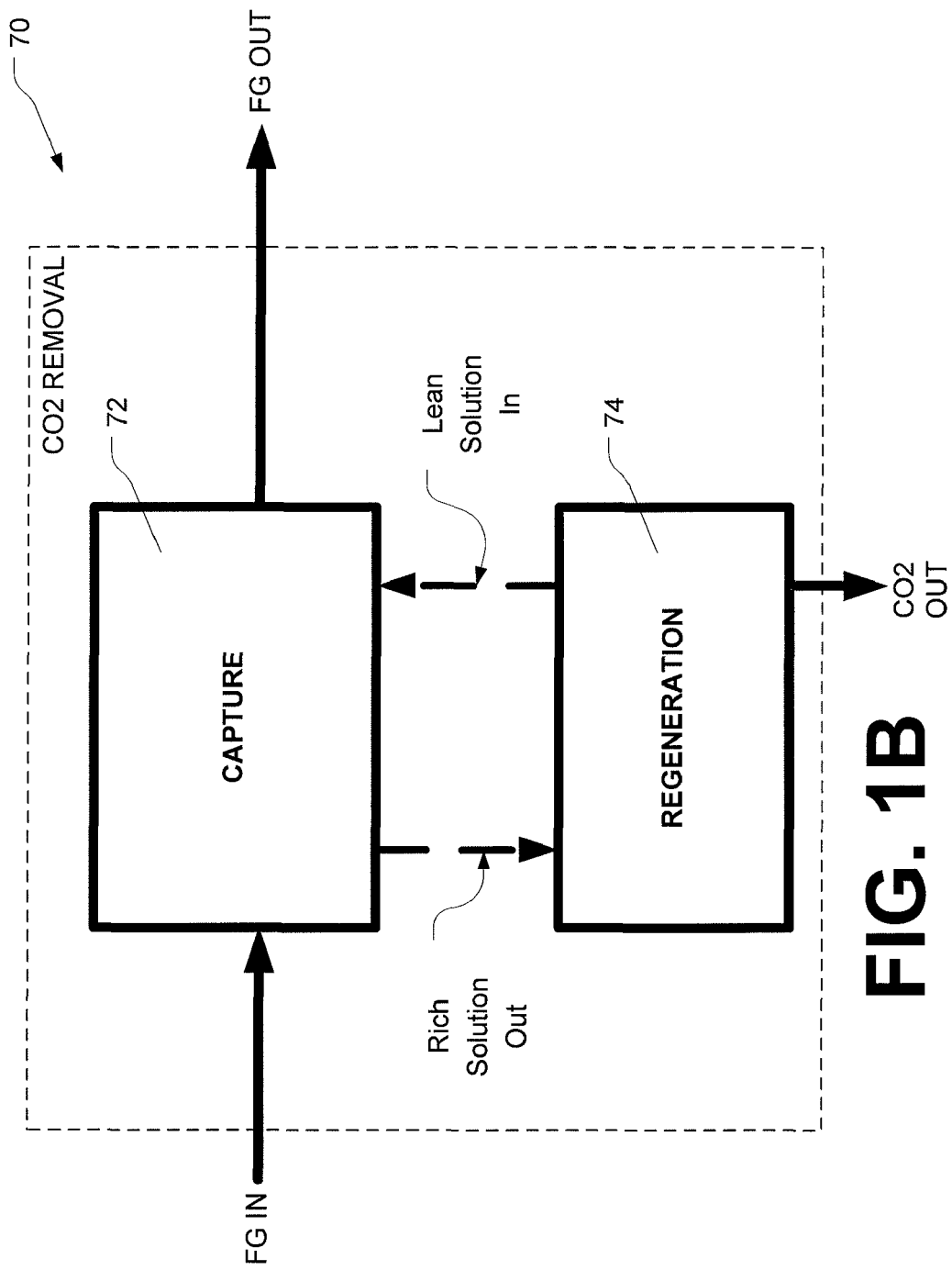
FIG. 1B is a diagram generally depicting further details of a CO2 removal system 70 that includes a capture system 72 and a regeneration system 74.

Each SDP (331, 332 and 333) is configured to deliver a flow of ionic solution (ionic solution flow) to the respective absorption stage via a liquid distribution device (312, 322 and 323 respectively). Each SDP will preferably include one or more cooling systems, such as, for example, a heat exchanger device, for cooling ionic solution pumped through the SDP. A control system (not shown) is also preferably provided for controlling the flow of the ionic solution and maintaining ionic solution temperature at a predetermined level or within a predetermined temperature range. The control system may also be provided for controlling the ammonia-to-CO2 mole ratio (R) to be at or within a predetermined value or within a predetermined range of values. With reference to FIG. 2A, absorption stage 272 includes a SDP 331 that is composed of conduit/pipe that connects rich solution outlet 283 with liquid distribution device 265 via pump 232 and heat exchanger 246. Absorption stage 274 includes a SDP 332 that is composed of conduit/pipe that brings lean ionic solution from regeneration system 74 (see FIG. 1B) to the liquid distribution device 264 via heat exchanger 242. Absorption stage 276 includes a SDP 333 that is composed of conduit/pipe that connects rich solution outlet 283 with liquid distribution device 263 via pump 232, heat exchanger 246, pump 234 and heat exchanger 244.

Absorption 272 is configured to contact a lean ionic solution received via SDP 333 ionic solution that is collected and recycled from near the bottom of the absorber vessel 270 with the flue gas stream. This ionic solution is pumped from the bottom of the absorber vessel 270 via pump 232 to the liquid distribution device 321, which sprays the ionic solution downward and onto the mass transfer device 311. In this way the flue gas stream FG comes into contact with the ionic solution sprayed from liquid distribution device 321. The temperature of the ionic solution at absorption stage 272 is preferably controlled to be in a range from 10° C. to 20° C. or higher. CO2 captured from the FG at absorption stage 272 forms ionic solution with precipitation of ammonium bicarbonate. After the ionic solution has been contacted with the flue gas stream FG it is rich in CO2 (rich solution). This rich in CO2 solution is discharged from absorption stage 272 to a regenerator system 74 (see FIG. 1B).

Absorption stage 274 is configured to operate at a high level of CO2 capture efficiency. In one embodiment, the absorption stage 274 is configured to capture, for example, 50-90% of the CO2 that may be contained in the flue gas stream FG. Here, lean CO2 solution from the regenerator 74 (not shown) is sprayed via liquid distribution device 322, onto the MTD 312. CO2 rich solution from absorption stage 276 also flows downward onto the MTD 312 where it mixes with the CO2 lean solution sprayed via the spray system 322, both of which are contacted with the flue gas stream FG as it flows upward through the absorber vessel 270.

Figure 1C:
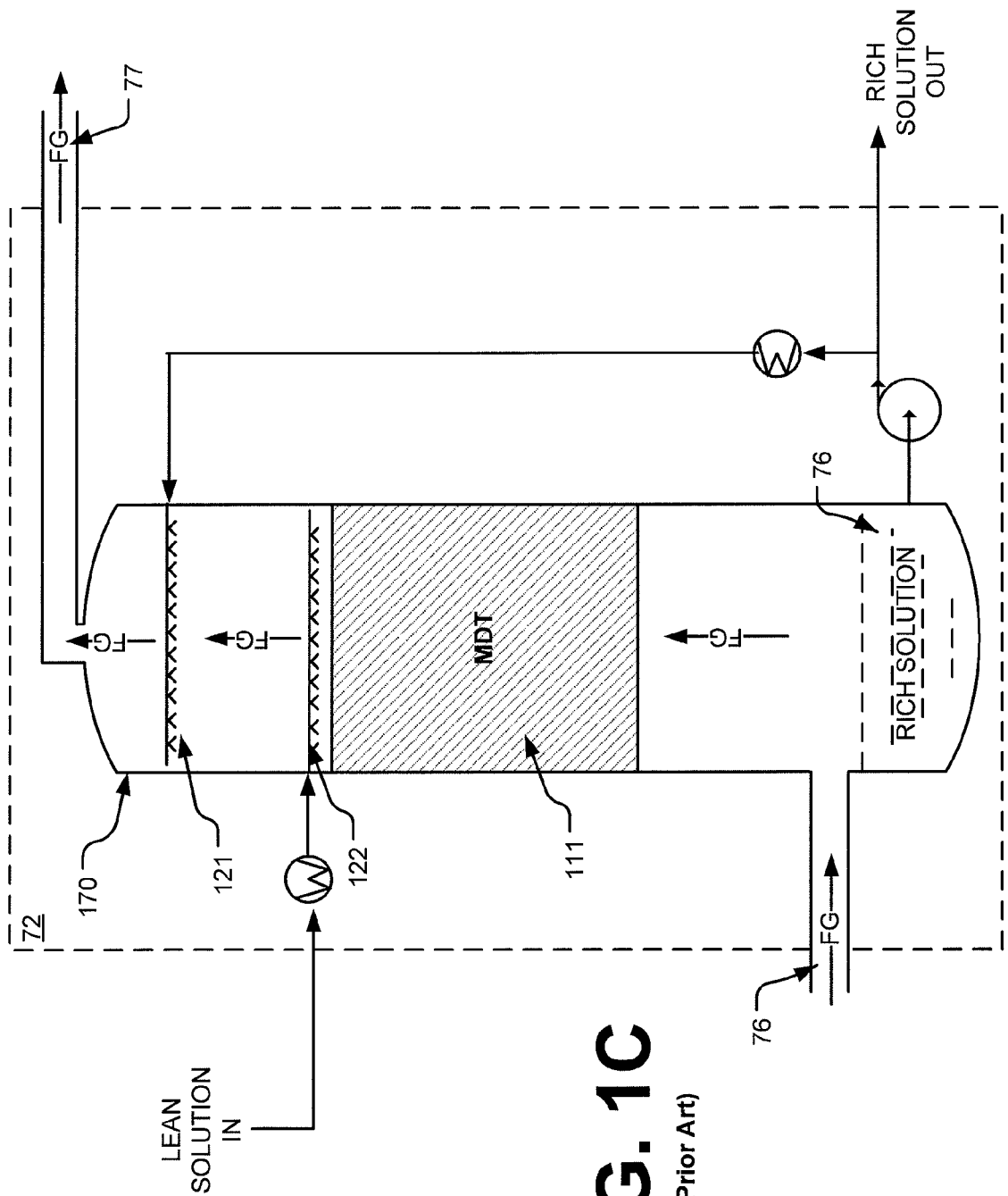
FIG. 1C is a diagram generally depicting details of a capture system 72.
Figure 1D:
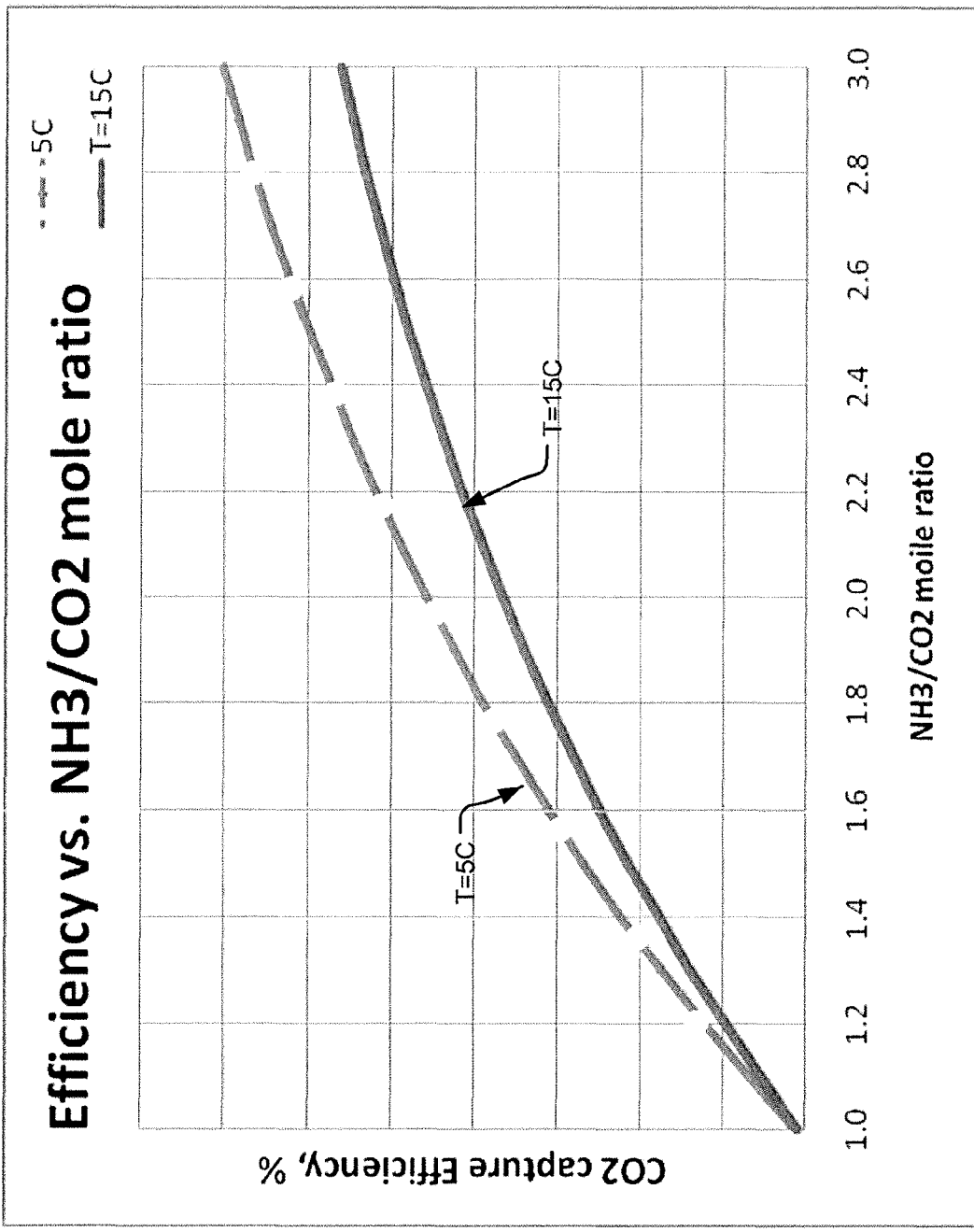
FIG. 1D is a diagram showing a graph that generally illustrates the effect of R and T on a CO2 systems capture efficiency.
Figure 1E:
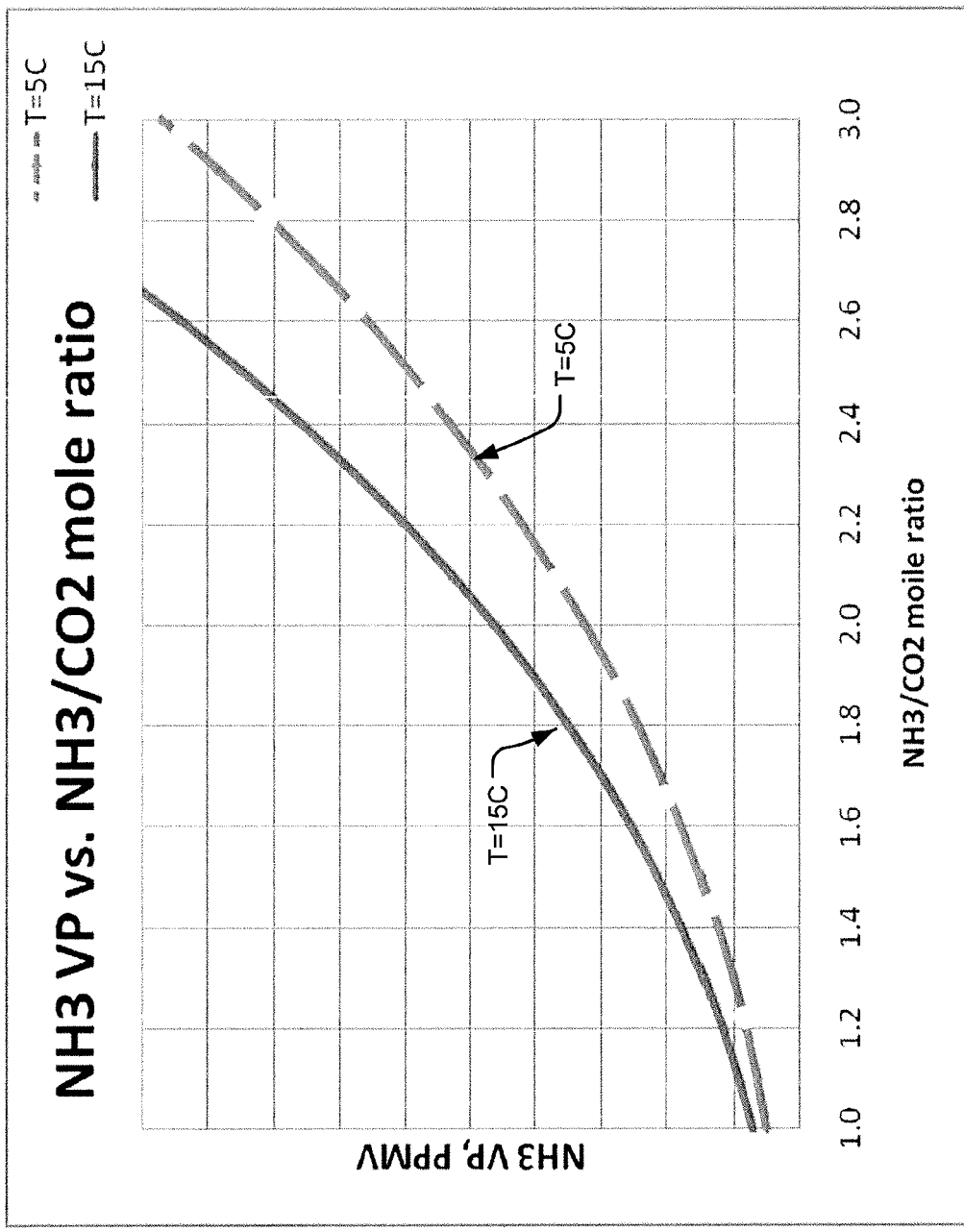
FIG. 1E is a diagram showing a graph that generally illustrates the effect of R and T on ammonia slip in a CO2 capture system.

The flue gas rising upward in the absorption vessel 270 from absorption stage 274 contains a low concentration of CO2 (for example 10% or less of the concentration in the FG inlet) and a relatively high concentration of NH3 (for example from 5000 ppm up to 10000 ppm). The high concentration of ammonia in the Flue Gas (ammonia slip) from absorption stage 274 is a result of the high R of the ionic solution in the absorption stage 274 (See FIG. 1E). A large portion of the ammonia that has evaporated in absorption stage 274 is recaptured back into the ionic solution via absorption stage 276, which preferably operates at a lower R value and lower temperature.

In absorption stage 276, a relatively small flow of ionic solution having a low R (for example, less than 1.8) and low temperature (for example, less than 10° C. and preferably about 5° C.) is sprayed via liquid distribution device 323 onto the MTD 313 wherein it is contacted with the flue gas stream FG as it flows upward through the MTD 313. The ammonia captured via absorption stage 276 flows downward and onto the top of the packing materials 312 of absorber stage 274.

The absorber vessel 270 may be configured to provide for circulation of ionic solution collected at the bottom of the vessel 270 to a hydrocyclone (not shown). The hydrocyclone (not shown) may be used to separate and remove solids that have formed within the ionic solution after being contacted with the flue gas stream.

Each of the absorption stages 272, 274 and 276 are configured to carry out a particular phase of the CO2 absorption process. For example, stage 272 is configured to carry out phase 1 of the process whereby a portion of the CO2 contained in the flue gas is captured. Stage 274 is configured to carry out phase 2 of the process whereby an additional portion of the CO2 contained in the flue gas is captured. Stage 276 is configured to carry out phase 3 of the process. In phase 3 an additional portion of the CO2 contained in the flue gas is captured.

In a preferred embodiment, between 40% and 90% of the CO2 contained in the flue gas stream FG when it enters the inlet 280 will be removed from the flue gas stream after being subjected to phases 1-3 and before it exits the exit 282. Each phase may or may not be carried out in a predetermined sequence.

In phase 1 of the CO2 absorption process a portion of the CO2 contained in the flue gas stream is removed via contacting the ionic solution with the flue gas stream. The temperature of the ionic solution during phase 1 is controlled to be higher than the temperature of the ionic solution at phase 2 or phase 3 of the CO2 absorption process. For example, at phase 1, the temperature of the ionic solution is controlled to be from 10° C. to 20° C. The R of the ionic solution in Phase 1 is low, for example, 1.4 to 1.8.

During phase 1 solids of ammonium bicarbonate containing high concentrations of CO2 are allowed to precipitate from the ionic solution. These solids are then separated from the ionic solution and removed via, for example, a hydrocyclone (not shown). Once the solids are removed from the ionic solution, the ionic solution is leaner in CO2 (i.e. contains less CO2) and can be used to capture more CO2 from a flue gas stream.

The temperature of the ionic solution in phase 2 is lower than in phase 1, for example, in a range from 0° C. to 10° C. and the R value of the ionic solution is higher than in Phase 1, for example, from 1.8 to 2.0. The ionic solution in phase 2 is highly reactive and can capture a significant portion of the CO2 content of the flue gas. However, the reactive ionic solution in phase 2 has relatively high vapor pressure of ammonia which results in a relatively high ammonia concentration in the flue gas flowing to the top stage 276 (phase 3) of the CO2 absorption process.

During phase 3 loss of gaseous ammonia is minimized by controlling the temperature T and the R of the ionic solution so as to lower the vapor pressure of the ammonia from the ionic solution and thus to reduce the ammonia concentration in the gas phase of Phase 3. By reducing ammonia vapor pressure and keeping most of the ammonia as part of the liquid ionic solution, ammonia losses from the system will be minimized. This reduction in ammonium slip helps keep the NH3 to CO2 mole ratio R at a higher level, for example, from 1.8 to 2.0. As a result, the effectiveness of the system in removing CO2 from the flue gas stream is preserved or otherwise not deteriorated. The temperature of the ionic solution at phase 3 is controlled to be, for example, from 0° C. to 10° C.

Figure 2B:
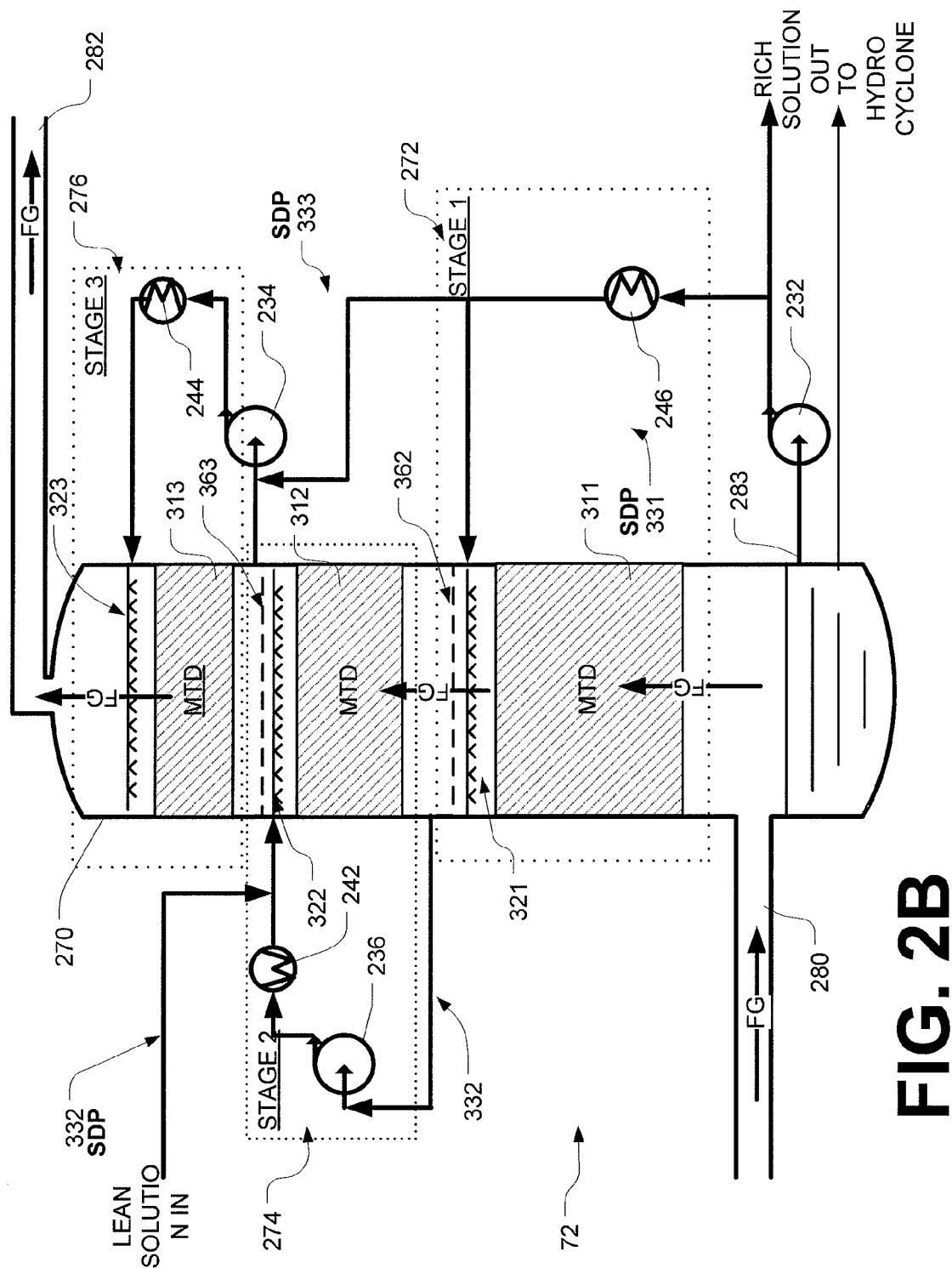
FIG. 2B is a diagram generally depicting another embodiment of a capture system 72 that includes a multi-stage absorber system.

The absorber shown in FIG. 2B is a diagram generally depicting a further embodiment of the proposed invention. This embodiment is similar to that shown in FIG. 2A and comprises of three CO2 absorption stages. In this embodiment, absorption 274 and 276 include a retention trough 362 and 363, respectively, that is configured to collect at least a portion of the solution that flows downward from and through the MTD positioned above the trough 362 and/or 363. More particularly, the trough 362 collects at least a portion of the solution flowing downward from the MTD 312 of absorption stage 274, as well as MTD 313 of absorption stage 276. The collected solution is then pumped (re-circulated), at least in part, from the trough 362 via pump 236 to the liquid distribution device 322 where it is again sprayed, along with lean ionic solution from the regenerator 74 (FIG. 1C) onto the MTD 312 of absorption stage 274.

Similarly, the trough 363 collects at least a portion of the solution migrating downward from/through the MTD 313 of absorption stage 276. The collected solution is then pumped (re-circulated), at least in part, from the trough 363 via pump 234 back up to the liquid distribution device 323 where it is again sprayed onto the MTD 313 of absorption stage 276 (276).

The heat rejected from absorption stage 272, as well as absorption stage 274, occur at a relatively high temperature (up to 10° C.-20° C.). This cooling can be achieved with seawater or cooling tower water if ambient conditions allow it, hence reducing the overall demand for chilling the solution significantly. When chilled water is used, the power consumption for chilling the higher temperature ionic solution is much lower than the power required for chilling the lower temperature ionic solution.

The three absorption stages 272, 274 and/or 276 can be provided in a single absorber vessel 270 as shown in FIG. 2A and FIG. 2B. Alternatively, separate absorber vessels, each dedicated to a specific absorption stage or set of absorption stages, may be used. It is also possible to dedicate a single absorber vessel to a single absorption stage, while another absorption vessel is dedicated to more than one of the absorption stages. An example of a multi-stage, multi-absorber vessel CO2 removal system is generally depicted in FIG. 2C.

A further embodiment is generally depicted in FIG. 2C. With reference to FIG. 2C it can be seen that three separate absorber vessels 270a, 270b and 270c are provided to accommodate a three-stage absorber system. In this embodiment, each of the vessels 270a, 270b and 270c are dedicated to a particular absorption stage (stage 272, stage 274 or stage 276) and each may be configured to deliver/contact ionic solution with the flue gas stream FG in a predetermined sequence, for a pre-determined period of time and at a predetermined temperature.

The absorber vessel 270a may be configured to provide for circulation of ionic solution collected at the bottom of the vessel 270a to a hydrocyclone (not shown). The hydrocyclone (not shown) may be used to separate and remove solids that have formed within the ionic solution after being contacted with the flue gas stream. In a further embodiment, each of the absorber vessels 270a, 270b and 270c may be configured to provide for circulation of ionic solution collected at the bottom of the vessel 270a/270b and/or 270c to a hydrocyclone (not shown).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method for removing carbon dioxide from a flue gas stream using a series of absorption stages in which a flue gas stream is contacted with an ionic solution containing ammonia, the series of absorption stages including a first absorption stage and a last absorption stage relative to the flow direction of the flue gas stream, the method comprising:

controlling a temperature and an ammonia-to-CO2 mole ratio of the ionic solution provided to each stage in the series of absorption stages such that the ionic solution provided to the first absorption stage has a higher temperature and a lower ammonia-to-CO2 mole ratio than the ionic solution provided to the last absorption stage.

2. The method of claim 1, wherein the temperature of the ionic solution provided to first absorption stage is between 10° C. and 20° C.; and the temperature of the ionic solution provided to the last absorption stage is between 0° C. and 10° C.

3. The method of claim 2 wherein the R of the ionic solution provided to the last absorption stage is in the range of 1.8-2.0.

4. The method of claim 3 wherein the R of the ionic solution provided to the first absorption stage is in the range of 1.4-1.8.

5. The method of claim 1, wherein the series of absorption stages includes an intermediate absorption stage, and wherein the ionic solution provided to each of the first, intermediate, and last stages has a different R value.

6. The method of claim 5, wherein the ionic solution provided to each of the first, intermediate, and last stages has a different temperature.

7. The method of claim 6, wherein the temperature of the ionic solution provided to first absorption stage is between 10° C. and 20° C.; the temperature of the ionic solution provided to the last absorption stage is between 0° C. and 10° C.; and the temperature of the ionic solution provided to the intermediate absorption stage is between 10° C. and 20° C.

8. The method of claim 7, wherein the R of the ionic solution provided to the last absorption stage is in the range of 1.8-2.0, and the R of the ionic solution provided to the first absorption stage is in the range of 1.4-1.8.

9. The method of claim 1, wherein the temperature and the R of the ionic solution provided to the first absorption stage is selected to promote the precipitation of ammonia bicarbonate solids in the first stage.

10. The method of claim 9, further comprising:
collecting the ammonia bicarbonate solids in the first stage, and
removing the collected ammonia bicarbonate solids from the first stage.

11. The method of claim 10, further comprising:
separating the removed ammonia bicarbonate solids from the ionic solution in a hydroclone.

12. The method of claim 1, wherein the series of absorption stages are contained in a single absorption vessel.

13. A system for removing carbon dioxide from a flue gas stream, the system comprising:
a series of absorption stages including a first absorption stage and a last absorption stage relative to the flow direction of the flue gas stream, each absorption stage in the series of absorption stages including:
a gas-liquid contact mass transfer device;
a liquid distribution device; and
a solution delivery path configured to deliver a supply of ionic solution to the liquid distribution device, the solution delivery path including a heat exchange device;
wherein
the solution delivery paths for the first and last absorption stages are configured to provide the first absorption stage with an ionic solution having a lower ammonia-to-CO2 mole ratio than an ammonia-to-CO2 mole ratio of the ionic solution provided to the last absorption stage.

14. The system of claim 13, wherein:
the solution delivery path of the first absorption stage is in fluid communication with a rich solution outlet of the first absorption stage, thereby providing for the flow of ionic solution from the rich solution outlet of the first absorption stage to the heat exchange device and the liquid distribution device in the first absorption stage, and
the solution delivery path of the last absorption stage is in fluid communication with the rich solution outlet of the first absorption stage, thereby providing for the flow of ionic solution from the rich solution outlet of the first absorption stage to the heat exchange device and the liquid distribution device in the last absorption stage.

15. The system of claim 14, wherein the solution delivery path of the last absorption stage is also in fluid communication with a rich solution outlet of the last absorption stage, thereby providing for the flow of ionic solution from the rich solution outlet of the last absorption stage to the heat exchange device and the liquid distribution device in the last absorption stage.

16. The system of claim 13, wherein the series of absorption stages includes an intermediate absorption stage, and the solution delivery path for the first, intermediate, and last absorption stages are configured to provide the first, intermediate, and last absorption stages with ionic solution having different R values.

17. The system of claim 16, wherein:
the solution delivery path of the first absorption stage is in fluid communication with a rich solution outlet of the first absorption stage, thereby providing for the flow of ionic solution from the rich solution outlet of the first absorption stage to the heat exchange device and the liquid distribution device of the first absorption stage,
the solution delivery path of the last absorption stage is in fluid communication with the rich solution outlet of the first absorption stage, thereby providing for the flow of ionic solution from the rich solution outlet of the first absorption stage to the heat exchange device and the liquid distribution device of the last absorption stage; and
the solution delivery path of the intermediate absorption stage is in fluid communication with a source of lean ionic solution, thereby providing for the flow of lean ionic solution from the source to the liquid distribution device of the intermediate absorption stage.

18. The system of claim 17, wherein the solution delivery path of the intermediate absorption stage is also in fluid communication with a rich solution outlet of the intermediate absorption stage, thereby providing for the flow of ionic solution from the rich solution outlet of the intermediate absorption stage to the heat exchange device and the liquid distribution device of the intermediate absorption stage.

19. The system of claim 18, wherein the solution delivery path of the last absorption stage is also in fluid communication with a rich solution outlet of the last absorption stage, thereby providing for the flow of ionic solution from the rich solution outlet of the last absorption stage to the heat exchange device and the liquid distribution device of the last absorption stage.

20. The system of claim 16, wherein the series of absorption stages are contained in a single absorption vessel.

* * * * *